United States Patent
Jeppe (10) Patent No.: US 12,190,462 B2
(45) Date of Patent: Jan. 7, 2025

(54) SYSTEMS AND METHODS FOR RENDERING IMAGES

(71) Applicant: Arthur Jeppe, Costa Mesa, CA (US)

(72) Inventor: Arthur Jeppe, Costa Mesa, CA (US)

(*) Notice: Subject to any disclaimer, the term of this patent is extended or adjusted under 35 U.S.C. 154(b) by 0 days.

(21) Appl. No.: 18/138,713

(22) Filed: Apr. 24, 2023

(65) Prior Publication Data

US 2024/0355060 A1    Oct. 24, 2024

(51) Int. Cl.
*G06T 19/00* (2011.01)
*H04W 64/00* (2009.01)

(52) U.S. Cl.
CPC ......... *G06T 19/006* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 9,716,842 | B1* | 7/2017 | Worley | G06F 3/147 |
| 10,559,121 | B1* | 2/2020 | Moudgil | G06T 15/50 |
| 2003/0085901 | A1* | 5/2003 | Peleg | G11B 27/028 |
| | | | | 348/E5.022 |
| 2007/0124293 | A1* | 5/2007 | Lakowske | G06F 16/68 |
| 2007/0132785 | A1* | 6/2007 | Ebersole | A63F 13/213 |
| | | | | 345/633 |
| 2009/0299857 | A1* | 12/2009 | Brubaker | G06Q 30/02 |
| | | | | 455/99 |
| 2014/0316900 | A1* | 10/2014 | Amla | G06Q 30/0266 |
| | | | | 705/14.63 |
| 2015/0348322 | A1* | 12/2015 | Ligameri | G02B 27/017 |
| | | | | 345/633 |
| 2016/0328965 | A1* | 11/2016 | Safer | H04L 67/025 |
| 2017/0287189 | A1* | 10/2017 | Bhuruth | G06F 3/005 |
| 2017/0324154 | A1* | 11/2017 | Hendrix | H01Q 1/1228 |
| 2018/0075481 | A1* | 3/2018 | Adoni | G06F 16/285 |
| 2021/0134061 | A1* | 5/2021 | Timonen | G06F 3/013 |
| 2022/0398947 | A1* | 12/2022 | DeLorean | G09F 19/22 |
| 2023/0034337 | A1* | 2/2023 | Gorski | G06Q 50/34 |
| 2023/0316665 | A1* | 10/2023 | Aitbayev | G06T 19/006 |
| | | | | 345/426 |
| 2023/0336934 | A1* | 10/2023 | Igarashi | H04R 5/04 |

* cited by examiner

*Primary Examiner* — David H Chu
(74) *Attorney, Agent, or Firm* — Camuti Law Group APC; Nathan Camuti (57) ABSTRACT

Systems and methods for rendering images that include a non-transitory memory storing an executable code, an object model, a location information, wherein the location information includes global positioning system (GPS) coordinates, and a hardware processor executing the executable code to receive an environmental input from a first input device, the environmental input including a real-time environmental information, generate a rendering of an object based on the object model, the location information, and the real-time environmental information. The systems and methods for rendering images may further receive a position input from a second input device, the position input including a viewer position information, update the rendering of the object based on the viewer position information, receive a sound input from a third input device, the sound input including a sound information, and update the rendering of the object based on the sound information.

18 Claims, 5 Drawing Sheets

SYSTEMS AND METHODS FOR RENDERING IMAGES

BACKGROUND

Presently, existing technology may place images of objects in a background setting, including on displays, billboards, and the like. However, there remains a need to improve upon the current technology to make renderings of three-dimensional objects appear more realistic, making the objects appear as if they are physically located within a designated location and environment, incorporating additional features including location-specific lighting angles, light intensities, light color, shadows, materials, textures, and more. Additional improvements include customizing the rendered object to realistically appear in a setting based on real-time location and real-time environment information. The present disclosure provides for a novel system and methods for rendering images that addresses the above noted problems and difficulties while rendering realistic images.

SUMMARY

The present disclosure provides a novel approach directed to systems and methods for rendering images, substantially as shown in and/or described in connection with at least one of the figures, as set forth more completely in the claims.

In some implementations, the system for rendering images includes a non-transitory memory storing an executable code, an object model, and a location information, wherein the location information includes global positioning system (GPS) coordinates, and a hardware processor executing the executable code to receive an environmental input from an environmental input device, the environmental input including a real-time environmental information, and generate a rendering of an object based on the object model, the location information, and the real-time environmental information.

In some implementations, the system is further configured to receive a position input from a position input device, the position input including a viewer position information, and update the rendering of the object based on the viewer position information.

In some implementations, the system is further configured to receive a sound input from a sound input device, the sound input including a sound information, and update the rendering of the object based on the sound information.

In some implementations, the system further comprises a display, wherein the system is further configured to display the rendering of the object on the display, wherein the display is at least one of a digital screen, a television, a computer monitor, a mobile phone, a tablet computer, an AR/VR headset, a pair of smart glasses, a digital advertising sign, and a billboard.

In some implementations, the object model includes at least one of a structural information, a materials information, and a texture information.

In some implementations, the location information is dynamically updated based on a local sun position information.

In some implementations, the environmental input device is at least one of a camera, a camera array, a website, a thermometer, a wind vane, and an anemometer, wherein the real-time environmental information includes at least one of a plurality of images covering a range of at least 180-degrees to 360-degrees views of a location, a panoramic image, a 2-dimensional (2-D) image, an environmental data, a local weather information, a local time information, and a lighting information.

In some implementations, the position input device is at least one of a camera, a mobile phone, and a GPS device, and wherein the viewer position information is at least one of a viewer position in relation to the object and a viewer position in relation to a display of the object.

In some implementations, the sound input device is at least one microphone, and wherein the sound information includes one or more of a sound volume and a sound direction, and thereby alters an appearance of the rendering of the object based one or more of the sound volume and the sound direction.

In some implementations, the non-transitory memory further stores a traffic information, and the system is further configured to update the rendering of the object based on the traffic information, wherein the traffic information includes at least one of peak commuter times, prevailing foot traffic, and target demographic information.

In other implementations, the method for rendering images uses an image rendering system having a non-transitory memory and a hardware processor, wherein the non-transitory memory stores an object model and a location information, wherein the location information includes at least one of a global positioning system (GPS) coordinates, the method comprising receiving, using the hardware processor, an environmental input from an environmental input device, the environmental input including a real-time environmental information, and generating, using the hardware processor, a rendering of an object based on the object model, the location information, and the real-time environmental information.

In some implementations, the method further comprises receiving, using the hardware processor, a position input from a position input device, the position input including a viewer position information, and updating, using the hardware processor, the rendering of the object based on the viewer position information.

In some implementations, the method further comprises receiving, using the hardware processor, a sound input from a sound input device, the sound input including a sound information, and updating, using the hardware processor, the rendering of the object based on the sound information.

In some implementations, the method further comprises displaying, using the hardware processor, the rendering of the object on a display, wherein the display is at least one of a digital screen, a television, a computer monitor, a mobile phone, a tablet computer, an AR/VR headset, a pair of smart glasses, a digital advertising sign, and a billboard.

In some implementations, the object model includes at least one of a structural information, a materials information, and a texture information.

In some implementations, the location information is dynamically updated based on a local sun position information.

In some implementations, the environmental input device is at least one of a camera, a camera array, a computer, a website, a thermometer, a wind vane, and an anemometer, wherein the real-time location information includes at least one of a plurality of images covering a range of at least 180-degrees to 360-degrees views of a location, a panoramic image, a 2-D image, an environmental data, a local weather information, local time information, and a lighting information.

In some implementations, the position input device is at least one of a camera, a mobile phone, and a GPS device, and wherein the viewer position information is at least one of a viewer position in relation to the object and a viewer position in relation to a display of the object.

In some implementations, the sound input device is at least one microphone, and wherein the sound information includes one more of a sound volume and a sound direction, and thereby alters an appearance of the rendering of the object based on one or more of the sound volume and the sound direction.

In some implementations, the non-transitory memory further stores a traffic information, and wherein the method further comprises updating, using the hardware processor, the rendering of the object based on the traffic information, wherein the traffic information includes at least one of peak commuter times, prevailing foot traffic, and target demographic information.

DETAILED DESCRIPTION

The following description contains specific information pertaining to embodiments and implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

Figure 1:
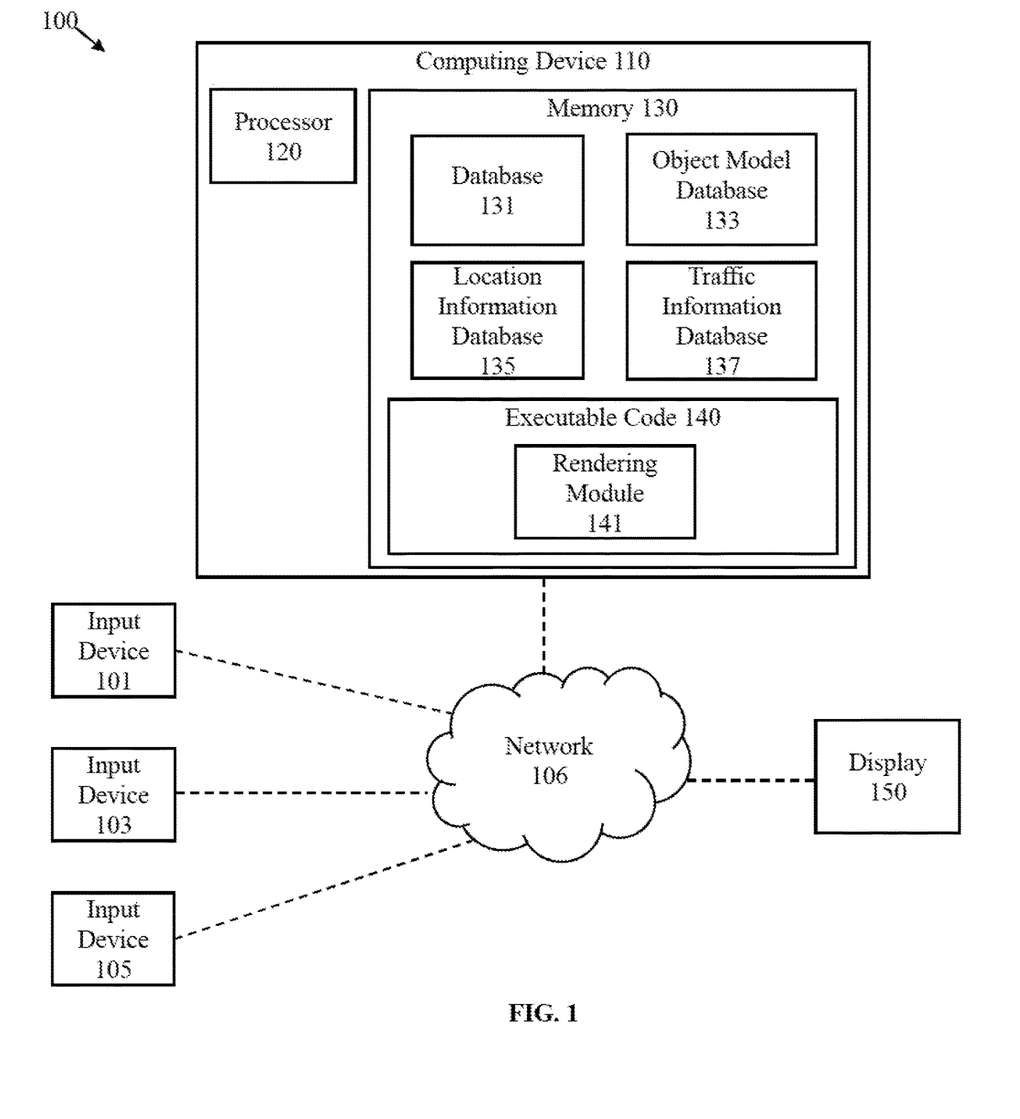
FIG. 1 shows a diagram of an exemplary system for rendering images, according to one implementation of the present disclosure.

FIG. 1 shows a diagram of an exemplary system for rendering images, according to one implementation of the present disclosure. System 100 includes input device 101, input device 103, input device 105, network 106, computing device 110, and display 150. Input device 101 is a device to receive environmental information about a location. In some implementations, environmental information about a location may include input such as lighting information, temperature information, wind information, or other information about an environment. Input device 101 may be a camera, a camera array, a website, a thermometer, a wind vane, an anemometer, or other sensor for receiving environmental information. In some implementations, input device 101 may be a single camera, a camera with panorama mode, a 360-degree camera, a 180-degree camera, two 180-degree cameras, or an array of cameras including more than two cameras capturing images covering part or all of a sphere around the position where an object rendering is to appear. In some implementations, rendering includes system 100 generating a 3-dimensional (3-D) rendering of an object. In some implementations, the rendering may be a 3-D image of an object model on the display. In some implementations, the rendering may be a 2-dimensional (2-D) image of a 3-D object on the display. In some implementations, the rendering on an augmented reality (AR) or virtual reality (VR) display is a 3-D rendering of an object. In some implementations, input device 101 may be at least one of a still camera, a video camera, a camera that that captures local lighting information, a camera that captures data, a depth camera, and a camera that captures non-visible spectrum data.

Input device 103 may be a device to determine viewer position information. In some implementations, input device may determine viewer position information, which includes at least one of a viewer position in relation to an object and a viewer position in relation to a display of the object. In some implementations, a viewer position may include at least one of a viewer's direction of view information in relation to the rendered object and a viewer's direction of view in relation to a display showing the rendered object. In some implementations, input device 103 may determine viewer location, viewer orientation, and other relevant information. In some implementations, the viewer orientation is the angle of view to the screen. For example, on a subway sign display that is positioned at a 45-degree angle to a walkway, the display shows the rendered object to accommodate the 45-degree angle so that the ideal view of the rendered image is shown on display to those on the walkway. In some implementations, input device 103 may determine position information and transmit the position information. In some implementations, the position information may include information about a geographic position where a rendered image is to appear. Input device 103 may be at least one of a camera, a mobile phone, a global positioning system (GPS) device, or other device suitable for determining a geographic position. In some implementations, a geographic position may be a latitude and a longitude corresponding to system 100. In some implementations, a geographic position may be a viewer's orientation or point of view (POV). POV is the position of the viewer(s) in relation to the display. Input device 105 is a device to receive audio input. Input device 105 may be a microphone. Network 106 is a computer network. Network 106 may be a local area network (LAN), a wide area network (WAN), a wired network, a wireless network, or the internet.

Input device 101, input device 103, and input device 105 are each connected to computing device 110. As shown in FIG. 1, input device 101, input device 103, and input device 105 are each connected to computing device 110 via network 106. In some implementations, the connection between input device 101 and network 106 may be a wired connection. In some implementations, the connection between input device 101 and network 106 may be a wireless connection. In some implementations, the connection between input device 103 and network 106 may be a wired connection. In some implementations, the connection between input device 103 and network 106 may be a wireless connection. In some implementations, the connection between input device 105 and network 106 may be a wired connection. In some implementations, the connection between input device 105 and network 106 may be a wireless connection.

In some implementations, the connection between input device 101 and computing device 110 may be a wired connection. In some implementations, the connection between input device 101 and computing device 110 may be a wireless connection. In some implementations, input device 103 may be connected to computing device. In some implementations, the connection between input device 103 and computing device 110 may be a wired connection. In some implementations, the connection between input device 103 and computing device 110 may be a wireless connection. In some implementations, input device 105 may be connected to computing device. In some implementations, the connection between input device 105 and computing device 110 may be a wired connection. In some implementations, the connection between input device 105 and computing device 110 may be a wireless connection.

As shown in FIG. 1, computing device 110 is connected to network 106. In some implementations, the connection between computing device 110 and network 106 may be a wired connection. In some implementations, the connection between computing device 110 and network 106 may be a wireless connection.

Computing device 110 is a computing system for rendering images. As shown in FIG. 1, computing device 110 includes processor 120 and memory 130. Processor 120 is a hardware processor, such as a central processing unit (CPU) found in computing devices. Memory 130 is a non-transitory storage device for storing computer code for execution by processor 120, and also for storing various data and parameters. As shown in FIG. 1, memory 130 includes database 131, object model 133, location information database 135, traffic information database 137, and executable code 140.

In some implementations, object model database 133 may include structural information about an object model including dimensional information, materials information, textures information, and other relevant information for system 100 to generate a rendering of the object model. In some implementations, location information database 135 may include global positioning system (GPS) coordinates, local sun position information, and other relevant information about a location for system 100 to generate rendering of a setting and location for the object model. In some implementations, traffic information database 137 may include prevailing traffic directions, traffic speed, and traffic patterns at different times of the day. In some implementations, traffic information database 137 may include real-time generated information or database dataset. In some implementations, traffic information may be gathered directly on-site via cameras. In some implementations, traffic information database 137 may include demographics of the traffic. In some implementations, traffic information database 137 may include prevailing viewer angles at different times of the day. In some implementations, traffic may include foot traffic, automobile traffic, general commuter traffic, and the like. In some implementations, input device 101 may capture and apply real-time image-based lighting. Image-based lighting is a rendering technique that captures a representation of real-world light information as an image or a set of images, which is then used or applied to simulate real-world lighting for objects in a scene. In some implementations, image-based lighting may show that the local lighting influence may be affected by passing traffic.

As depicted in FIG. 1, executable code 140 is a computer algorithm stored in memory 130 for execution by processor 120 to render images. In some implementations, executable code 140 may include one or more software modules for execution by processor 120. As shown in FIG. 1, executable code 140 includes rendering module 141. In some implementations, executable code 140 may include additional software modules for execution by processor 120. Rendering module 141 is a software module stored in memory 130 for execution by processor to render an image of the object model based on inputs from input device 101, input device 103, and input device 105. In some implementations, the rendered image is a photorealistic image of the object model. In some implementations, the rendered image shows the object model appearing in a particular location. In some implementations, the rendered image shows realistic lighting. In some implementations, the rendered image depicts a realistic environment. In some implementations, the rendered image may be a rendering of an entire environment. In some implementations, the rendered image includes renderings of both an object and an environment.

In some implementations, an asset may be an object model with object data applied to the object model. An asset may include a wireframe or other object framework with object data applied, such as image-based lighting, wind-speed data, environmental data, and the like. An asset may include the object model and relevant data. In some implementations, an asset may be saved as a dataset before rendering. The asset may be transferred or exported. For example, an asset may be saved and exported to a video game for rendering by an associated video game system.

As shown in FIG. 1, display 150 is connected to network 106. In some implementations, the connection between display 150 and network 106 may be a wired connection. In some implementations, the connection between display 150 and network 106 may be a wireless connection. Display 150 shows images rendered from the systems and methods of the present disclosure. In some embodiments, display 150 may be at least one of a digital screen, a television, a computer monitor, a mobile phone, a tablet computer, a video game system display, an AR/VR headset, a pair of smart glasses, a digital advertising sign, a billboard, or other technology capable of displaying or conveying rendered images and/or rendered video. In some implementations, rendered video may include rendered images within a video. In some implementations, a rendered object may be inserted into a video having sequential frames, such that a rendered object is inserted into each frame of the video. For example, a video depicts the beach and crashing waves, and a rendered beverage bottle is inserted into the non-rendered video so that the non-rendered video of crashing waves is in the background of the beverage bottle, and in some implementations, the crashing waves may appear as a reflection on the curved surface of the beverage bottle. In some implementations, the video may be a locally streamed video, and a rendered object is inserted into the locally streamed video, such that the rendered image includes the corresponding, appropriate lighting of the locally streamed video. In some implementations, the video may be a pre-filmed video, and a rendered object with known lighting data is overlaid on the pre-filmed video. In some implementations, the entire environment is rendered. In some implementations, an entire video is rendered such that background and object are all rendered video and images.

Figure 2:
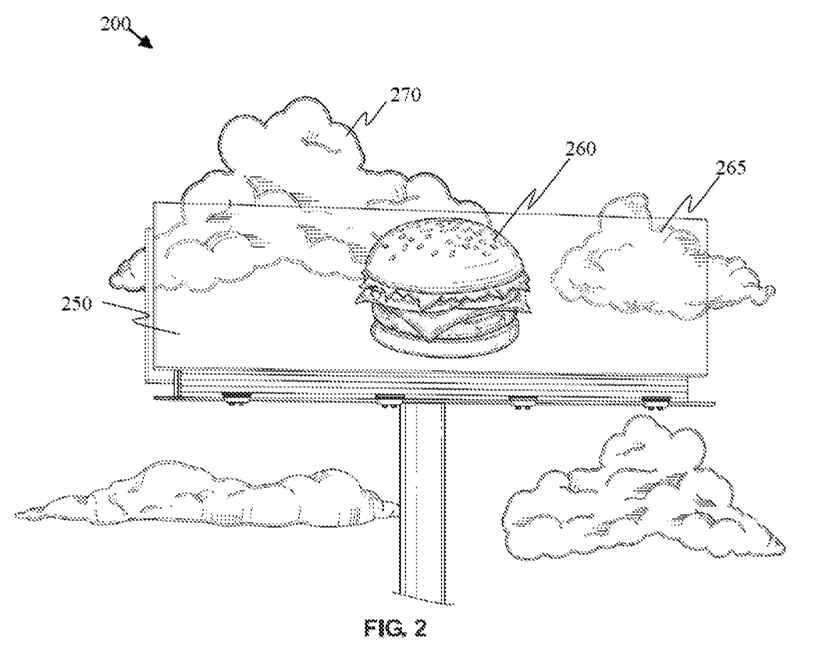
FIG. 2 shows a billboard display of a rendered image using the novel technology of the present disclosure, according to one implementation of the present disclosure.

FIG. 2 shows a display of a rendered image 200 using the novel technology of the present disclosure, according to one implementation of the present disclosure. In the depicted FIG. 2, display 250 is a billboard depicting a rendering of object 260 floating in display background 265 and real background 270. As depicted, rendering of object 260 is a rendering of a burger depicted in detail with texture, structure, and materials of the burger's bun, patty, and other ingredients. The generated rendering of object 260 is based on an object model, wherein object model database 133 includes at least one of a structural information, a materials information, and a texture information of the object model.

As depicted, some if not all of display background 265 appears to blend into real background 270. Display background 265 is a sky that blends in with real background 270 sky so that it appears that object 260 burger is floating in the sky. In some implementations, object 260 may appear to interact or mingle with other background surroundings, such as buildings, environment, landmarks, and the like. Display background 265 is generated after receiving an environmental input from first input device 101 (not shown) that may be placed on or near display 250. In some implementations, first input device 101 (not shown) may be a camera or a camera array that takes images of the surrounding environment, and the images are received and used in generating the rendering of object 260 within the surrounding environment with the local environment's lighting cues. As shown in FIG. 2, the images of the surrounding sky environment are received from first input device 101 (not shown) and shown on display 250 such that display background 265 appears to blend in with real background 270.

In some implementations, the appearance of display 250 varies based on viewer position in relation to display 250. The viewer position may be determined based on input received from second input device 103. In some implementations, second input device 103 may provide a viewer's position information such that the viewer is shown the ideal or desirable view of the rendering of object 260 within the display background 265 and real background 270 based on the position of the viewer in relation to display 250. Thus, the rendering of object 260 is updated based on the prevailing viewer position information obtained from second input device 103. In some implementations, updating the rendering of object 260 may include altering and adjusting the rendered view of object 260. In some implementations, second input device 103 may be at least one of a camera, a mobile phone, and a GPS device, and wherein the viewer position information is at least one of a viewer position in relation to the object and a viewer position in relation to a display of the object. In some implementations, the rendered image on a display may change depending on the direction and/or angle of viewer. In some implementations, the rendering may be a rotating image, rotating at a speed of a viewer walking or driving past the display, allowing the view of the object on the display to remain consistent as the viewer moves around or passes the display.

Figure 3A:
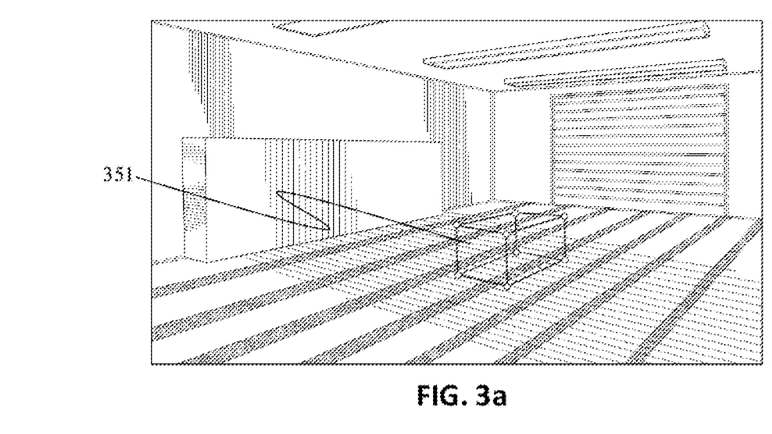
FIG. 3a shows an exemplary environment for rendering of an object, according to one implementation of the present disclosure.

FIG. 3a shows an exemplary environment for rendering of an object, according to one implementation of the present disclosure. FIG. 3a depicts a garage environment in which an object may be visually inserted into the position indicated by dotted box at location 351. Location 351 also indicates where input device 101 may be placed to receive environmental information about the garage environment, where input device 103 may be calibrated to determine the position of location 351 in the garage environment, and where input device 105 may receive audio input of the garage environment. The garage environment shows environmental information with location-specific details, including lighting above location 351, a light-colored floor beneath location 351, and contrasting lines painted on the light colored floor beneath location 351.

Figure 3B:
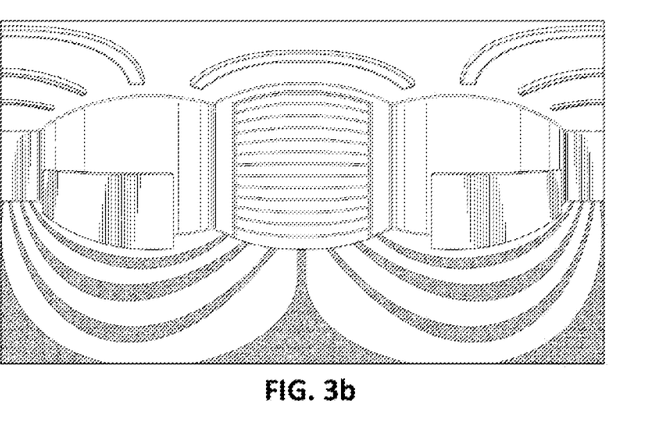
FIG. 3b shows a spherical image of the environment of FIG. 3a, according tome implementation of the present disclosure.

FIG. 3b shows a spherical image of the environment of FIG. 3a, according to one implementation of the present disclosure. In some implementations, the spherical image may be a 360-degree image captured by a 360-degree camera of the garage environment depicted in FIG. 3a. In some implementations, the camera may be a single camera, a 360-degree camera, two 180-degree cameras, or an array including more than two cameras capturing images covering part or all of a sphere around the position where the object is to appear. In some implementations, the camera may be a camera with panorama mode that captures panoramic images. In some implementations, the camera may be a camera that captures one or more flat images. In some implementations, the captured image may be a 360-degree image, a 180-degree image, a panoramic image, or a 2-D image.

Figure 3C:
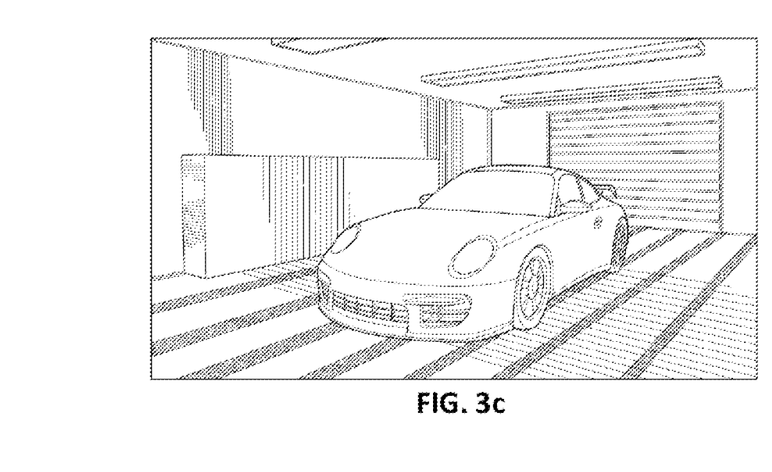
FIG. 3c shows an exemplary object inserted into in the environment of FIG. 3a, according to one implementation of the present disclosure.

FIG. 3c shows an exemplary object digitally inserted into in the environment of FIG. 3a, according to one implementation of the present disclosure. As depicted, the exemplary object is an unfinished object digitally inserted into the environment of FIG. 3a so that it is positioned and oriented appropriately from the POV of the viewer. Given that the exemplary object is unfinished, there is no environmental lighting added to the digitally inserted object.

Figure 3D:
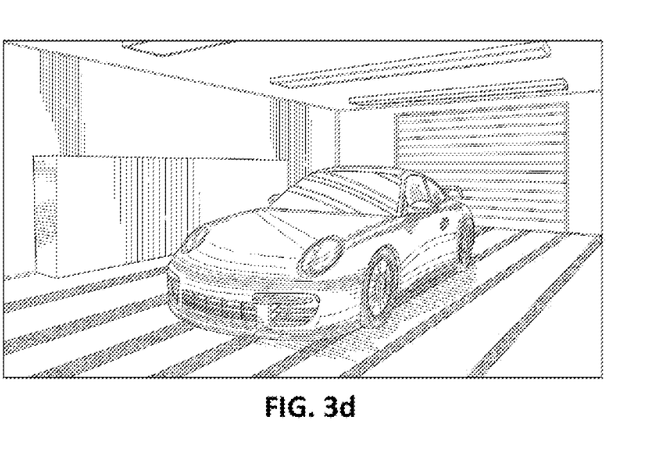
FIG. 3d shows an exemplary rendering of an object in the environment of FIG. 3a, according to one implementation of the present disclosure.

FIG. 3d shows an exemplary rendering of an object in the environment of FIG. 3a, according to one implementation of the present disclosure. FIG. 3d depicts object rendering with the lighting, texture, and structure of the vehicle clearly rendered as if the vehicle is physically in the environment. As depicted, the car has a chrome paint finish, rims, and rubber tires. FIG. 3d also depicts the overhead lights and painted lines on the garage floor reflecting off the shiny exterior of the vehicle. The rendering has incorporated information including texture, materials, structure, and local lighting and reflective inputs, to create a realistically integrated object and image as a whole.

FIGS. 4a, 4b, 4c, and 4d show different renderings of an object model inserted in different environments, according to an implementation of the present disclosure. Solid lines denote the object model, and dashed lines show the context of the object model in the image with reference to background and reflection.

As shown above in FIGS. 4a, 4b, 4c, and 4d, the 3-D object is a silver car. The car is inserted into 4 different environments, with various backgrounds and lighting conditions. The object model database containing information about the object model includes structural information about the object, including dimensional information, as well as possible materials information, including color and textural information, and other relevant information for the system to generate the rendering of the object. As shown in each picture, the sun position has changed, so the light, reflections, and shadows in and around the rendered car is different in each rendering.

Figure 4A:
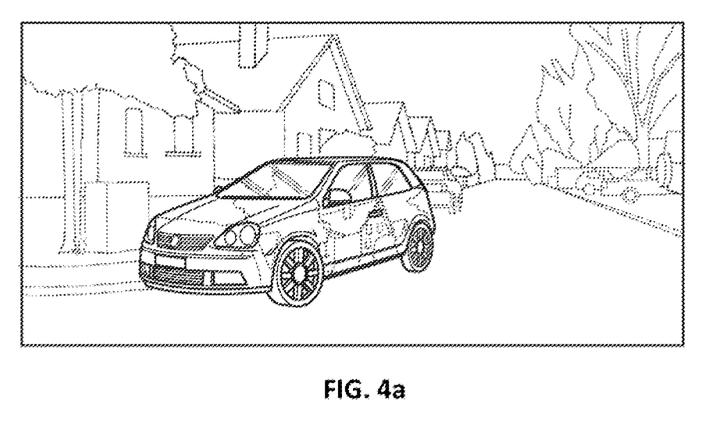
FIG. 4a shows an exemplary rendering of the effects of an environment upon an object inserted into that environment, according to one implementation of the present disclosure.
Figure 4B:
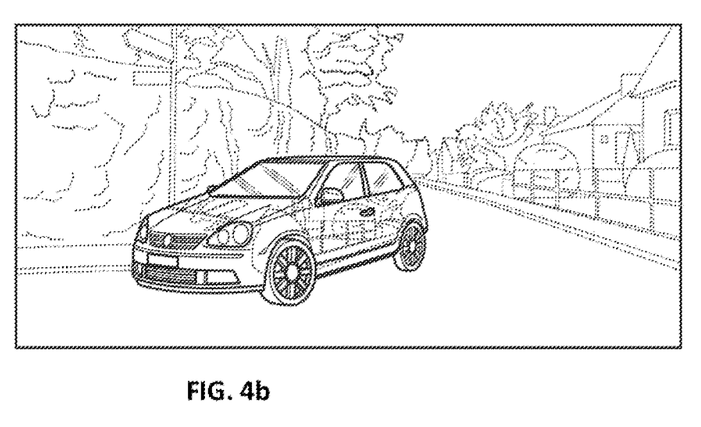
FIG. 4b shows an exemplary rendering of the effects of a different environment upon an object inserted into that environment, according to one implementation of the present disclosure.
Figure 4C:
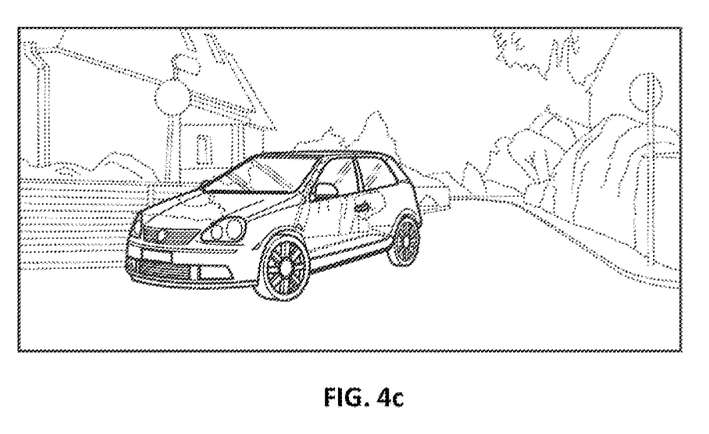
FIG. 4c shows an exemplary rendering of the effects of a different environment upon an object inserted into that environment, according to one implementation of the present disclosure.
Figure 4D:
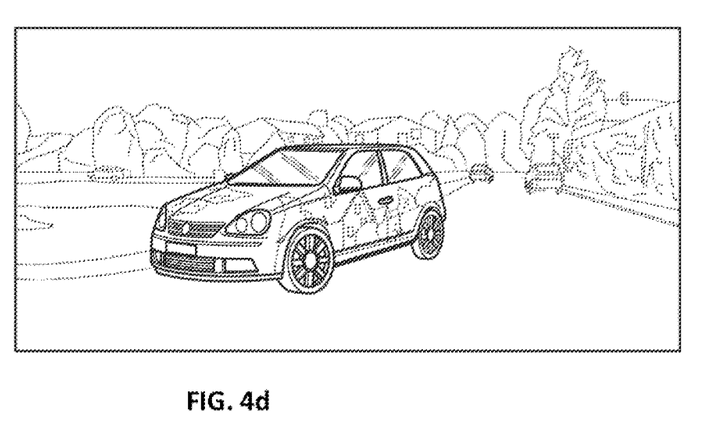
FIG. 4d shows an exemplary rendering of the effects of a different environment upon an object inserted into that environment, according to one implementation of the present disclosure.

In FIG. 4a, the shadows from a tree and surrounding houses are reflected on the car's surface. In FIG. 4b, the car is inserted into a street on a cloudy day, and the combination of location information and environmental information generates accurate lighting, including shadows shown under the car and reflections on the car as if the car were actually in that specific location and environment. Similarly, FIGS. 4c and 4d also show implementations of the car inserted into different locations and environments where the sun light direction is different and the renderings accurately portray the environment appropriate shadows, lighting, and reflections on and around the car.

Figure 5:
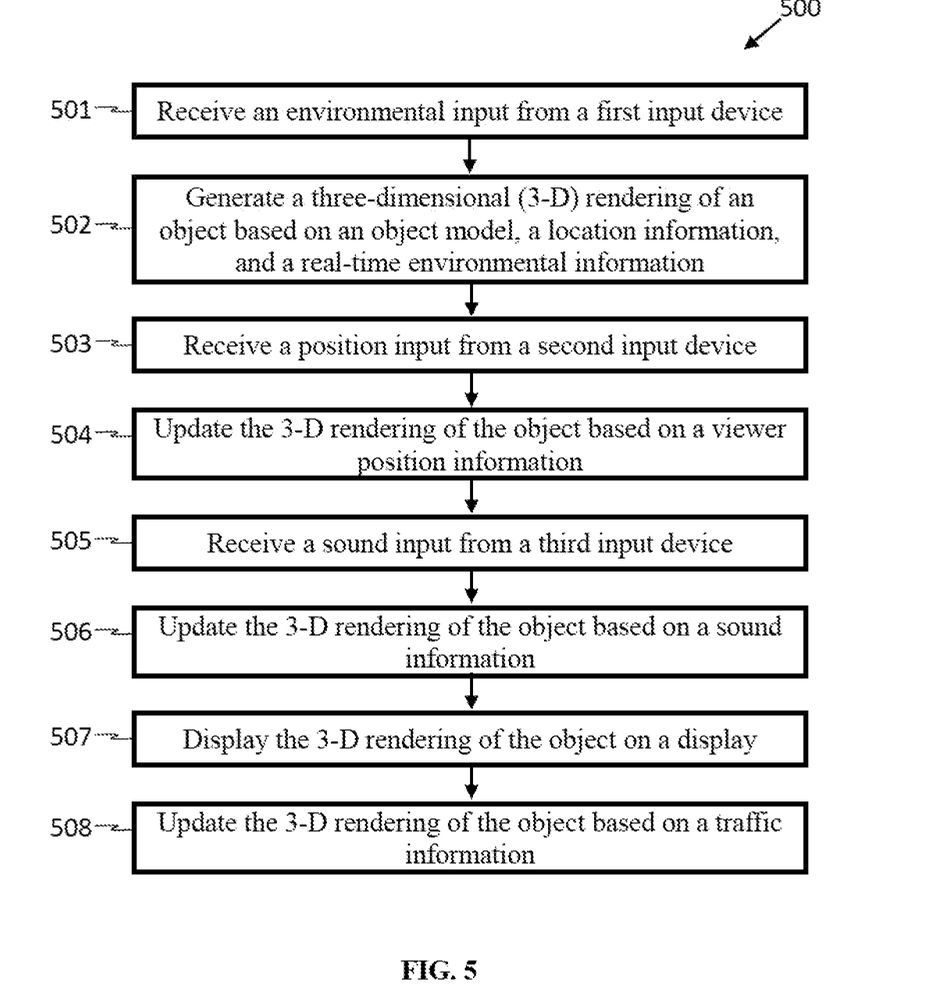
FIG. 5 shows a flowchart illustrating an exemplary method of rendering images, according to one implementation of the present disclosure.

FIG. 5 shows a flowchart illustrating an exemplary method of rendering images, according to one implementation of the present disclosure. Flowchart 500 begins at 501, where rendering module 141 receives an environmental input from first input device 101, the environmental input including a real-time environmental information. First input device 101 may be an environmental input device, which may be at least one of a camera, a camera array, a website, a thermometer, a wind vane, an anemometer, and any other sensor for receiving environmental information. In some implementations, the real-time environmental information may include at least one of a panoramic image, one or more flat images, a plurality of images covering a range of at least 180-degrees to 360-degrees views of a location, an environmental data, a local weather information, a local time information, and a lighting information. In some implementations, a local weather information may include information about temperature, precipitation, wind speed, wind direction, relative humidity, atmospheric pressure, and related information. For example, the environmental information may include environmental data and real-time images of the snow and wind in 28° F. weather conditions and wind direction in the Colorado Rocky Mountains at 6:00 pm in the evening. In another example, the environmental information may include environmental data and real-time images of 75° F. weather on a sunny beach in Hawaii at noon.

At 502, rendering module 141 generates a rendering of an object based on the object model, the location information, and the real-time environmental information. The object model and location information is stored in memory 130. In some implementations, after the system uses one or more cameras to gather real-time environmental information, the system generates the rendering of the object to appear as though the object exists in the environment. For example, the rendering of a beer can object in the Colorado Rocky Mountains on a snowy and windy day in 28° F. weather at 3:00 PM would include appropriate environmental lighting, including sunlight direction, sunlight intensity and sunlight color, sky reflections, frost coating the surface of the can and snowflakes blowing in a direction consistent with weather conditions at that time. In another example, the rendering of a beer can object on a beach in Hawaii at noon in 75° F. weather would instead show appropriate environmental lighting, including sunlight direction, sunlight intensity and sunlight color, sky reflections, condensation dripping down the can into a growing puddle on the surface the can is sitting on.

In another example, the system may use one or more of a wind vane, an anemometer, and other wind sensors to gather the real-time information, such as wind direction and wind speed created by a subway train arriving at a platform. As a result, the rendering of an object on a billboard in that subway station may appear to be blown by the same wind of the arriving train, from the same wind direction and wind speed. In another example, if an input device detects rain, a rendering may show similar rainfall interacting with the rendered objects on the display screen. For example, the rendering may show rain drops bouncing off the hood of a car. In some implementations, the raindrops may appear to be blowing in the wind or otherwise affected by local environmental information.

In some implementations, the system may be used to create a virtual window, allowing the viewer to see the product rendered as if it were in another location. In some implementations, the rendering may use visual and related data inputs from a first environment to render the object for display in a second location and environment, such as a virtual rendering showing an object image using inputs from sunny desert location on a display in a rainy city location. For example, in some implementations, the object image may be displayed in a Seattle location, but is rendered using one or more environmental inputs, including lighting information, environmental data, background images, and other relevant data inputs, gathered from a Palm Springs location. In another example, in some implementations, a rendering may be an object in sunny Palm Springs with associated environmental information shown on a display located in an overcast, rainy Seattle. In another example, in some implementations, a rendering may include an object in overcast, rainy Seattle and its associated environmental information on a display in the sunny desert Palm Springs.

At 503, rendering module 141 receives a position input from second input device 103, the position input including a viewer position information. In some implementations, the second input device may be a position input device. In some implementations, the position input device may be at least one of a camera, a mobile phone, and a GPS device. In some implementations, the second input device may be one or more motion sensing input devices, such as Kinect® produced by Microsoft®. In some implementations, the viewer position information is at least one of a viewer position in relation to the object and a viewer position in relation to a display of the object. In some implementations, a position input corresponds to the position of the viewer relative to a display of the object.

At 504, rendering module 141 updates the rendering of the object based on the viewer position information. The position of the viewer relative to the display of the object may be used to ensure that the viewer is shown the ideal or desirable view of the object. For example, the position of the viewer relative to the display of the object may allow the system to show the front of a product to the viewer even though the viewer is not positioned at the front and center of the display. In some implementations, the system may receive POV information corresponding to the position of the viewer allowing the system to deliver a view-specific image to the display with a motion/location sensing input. In some implementations, the view-specific display of the object may include a custom display such as augmented reality (AR) and virtual reality (VR). In some implementations, the rendered image on a display may change depending on the angle of viewer. In some implementations, the rendering may be a rotating image, rotating at a speed of a viewer walking or driving past the display, allowing the view of the object on the display to remain consistent as the viewer moves around or passes the display.

At 505, rendering module 141 receives a sound input from a third input device, the sound input including a sound information. In some implementations, the third input device is a sound input device such as a microphone. In some implementations, the microphone may be used for receiving sound input information. For example, a sound input device located on a sunny beach in Hawaii at noon may pick up audio sound of waves crashing on the shore.

At 506, rendering module 141 updates the rendering of the object based on the sound information. In some implementations, the sound information may include a sound volume and/or sound direction, thereby altering the appearance of the rendering of the object based on the sound volume and/or direction of the sound. In some implementations, the microphone may be used for interactive renderings, such as allowing the system to alter the appearance of the object in response to the noise volume and/or noise direction. For example, in some implementations, in an arena or stadium display, the object rendering may swell in size as the volume of the cheers from spectators increases. In another example, a rendered character may appear to react to a loud sound by turning its head or body towards the direction a sound is coming from. In another example, a rendered character's face and body may be animated to appear to speak words based on the sound information that one or more microphones receives, i.e., the animation showing the rendered face speaking is created based on a recorded audio. In some implementations, the sound input device is an array of microphones receiving sound information, including at least one of a sound direction and a sound volume.

At 507, rendering module 141 displays the rendering of the object on a display. In some implementations, the display is at least one of a digital screen, a television, a computer monitor, a mobile phone, a tablet computer, an AR/VR headset, a pair of smart glasses, a digital advertising sign, and a billboard. In some implementations, the system may use information about the setting, environment, and location of a display gathered from the camera(s) so the rendering appears to exist in the environment surrounding the display. In some implementations, the display may be a mobile billboard on a vehicle, and the rendered image may be updated based on the location information, which is dynamically updated based on at least one of GPS coordinates, orientation, and local sun position information. As a result, the rendered image is dynamically updated as the mobile billboard travels from one location to another. For example, a rendering displayed on a mobile billboard may include video input received from a spherical camera so that a mobile billboard traveling atop a vehicle will show renderings with real-word surroundings, including reflections, lighting, and the like.

At 508, rendering module 141 updates the rendering of the object based on a traffic information. In some implementations, traffic information is stored in traffic information database 137 in memory 130. In some implementations, traffic information may include at least one of peak commuter times, prevailing foot traffic direction, prevailing automobile traffic direction, and target demographic information. In some implementations, the types of advertisements on the billboards may vary based on the time of day, direction of traffic, and target demographics. For example, in a subway station billboard display, the rendered images may be directed at school age children between 2 pm to 4 pm, Monday through Friday, as children are leaving school heading to the subway station. In another example, the same subway station billboard display will show rendered images directed at adults commuting home between 5 pm and 7 pm after a typical workday. In another example, a billboard by a freeway may show advertisements catered to adults commuting home between 5 pm to 7 pm after a typical workday. In some implementations, the traffic information may include information about target market demographics identifiable by time and location. In some implementations, traffic information may be a real-time data or a real-time input (e.g., GOOGLE® traffic data, traffic monitoring systems from local and state government inputs, navigation apps and traffic apps, traffic monitoring camera(s) inputs, other traffic information providing services, etc.)

In some implementations, a rendering on the billboard display may be adjusted based on the prevailing traffic, which may include one or more of foot traffic and automobile traffic. In other situations, the display rendering could be set for the prevailing viewers' POV and is altered when that prevailing POV changes. For example, a billboard next to a freeway may alter the display rendering and orientation based on a prevailing traffic direction and view, which alternates from morning to evening. For instance, prevailing traffic direction on the freeway in the morning is northbound, whereas prevailing traffic direction on the freeway in the evening is southbound. In another example, the display rendering based on prevailing traffic direction may be different between a weekday and a weekend.

In some implementations, in an AR contemplation, an object may be inserted into the image that is displayed on a phone device based on location information, object model, phone inputs, and camera orientation to render the object such that it is better integrated into the environment. In some implementations, the rendering on an AR or VR display is a 3-D rendering of the object. In some implementations, based on various inputs, the system will recognize the position and direction of the sun and may incorporate the appropriate lighting solution into rendered images, creating light angles, reflections, and shadows that are better integrated with the environment the rendered object is added or inserted into. In some implementations, the system may incorporate image-based lighting into the rendered images.

In some implementations, renderings on billboards and other displays may make the display appear transparent by showing the rendering of the surrounding sky, buildings, and other surroundings that exist behind the display. In some implementations, a model of a background building may be built and textured, and a spherical image gathered by an input device may be used to generate the lighting input for a rendering of the building. Consequently, in some implementations, the rendered object may help the display to appear to be transparent, showing a rendering of the building that is behind the display as if the display was not present. In some implementations, additional rendered objects may be overlaid on the building rendering, making the rendered objects appear as if they are floating in mid-air in front of the background building. In some implementations, the system incorporates image-based lighting data, including the representation of real-world light information to simulate real-world lighting, into the rendered images of the building. In some implementations, real-world light information may be image-based lighting data.

In some implementations, the rendering of the object may use a hybrid lighting solution, which is a combination of location-based lighting gathered from inputs at a display's location and lighting solutions that more closely resemble product lighting solutions applied on lighting stages, light tables, and the like. In some implementations, location-based lighting inputs may include sunlight direction, sunlight color, sunlight intensity, sunlight highlights, reflections, shadows, and sky reflections. In some implementations, studio lighting inputs may be art directed lighting, such as digital versions of light boxes, cards, and kicker lights for highlights. In some implementations, an object model may include structural information, texture information, and materials information, studio lighting information, and the rendering is optimized based on inputs of location information and environmental information, including sunlight, highlights, reflections, shadows, and overhead lighting. In some implementations, overhead lighting may be ambient light of the setting, such as ambient lighting from the open top of a stadium for example.

In some implementations, the systems and methods of the present disclosure may be incorporated into video games. For example, the sun position may be sourced along with other environmental externalities, to drive the look and feel of a game and enhance the user's gaining experience. In some implementations, an improved augmented reality may be integrated into a user's setup with local or shared data points informing the look and feel of the game. For example, integrating local sun position would make the game more immersive for players, allowing individuals playing in California and Montana to experience in-game sun positions matched to their respective physical locations, thereby better connecting the each game's lighting environment to the player's local lighting conditions.

In some implementations, players may select environmental settings from other locations. For example, a player in California may play the game with a player in Montana, using Montana's real-time location inputs, including sun position, sound, wind, temperature, weather, and more. In some implementations, players may agree to play in a game world based on real-time environmental data in other locations, for example, allowing players to share experiences of playing the game based on real-time environmental data from Siberia or Hawaii. In some implementations, video game play may also incorporate real-time information and data rendered into the environment, such as balloons on the horizon showing real-time sports scores, stock market data, local news, weather, temperatures, and the like. In some implementations, image-based lighting is used to incorporate data rendered into the environment.

In some implementations, a player may choose the game's weather and lighting information from other places, such as weather in a different city, while keeping the local sun position of where the player is physically located. In some implementations, a player in a game may select different combinations of location and environmental information, such as weather, lighting and more, based on the environments of other locations. For example, a player in a racing game in one setting location, such as a racetrack in Abu Dhabi, may select the environment of Miami, such that the rendering is a racetrack in Abu Dhabi with weather, lighting, and other environmental information of Miami. In some implementations, a player may select a racetrack in California and use the real-time lighting and weather data from that location to render the gameplay images.

In some implementations, the systems and methods of the present disclosure may be incorporated into AR clothing try-ons. In some implementations, the object is one or more clothing pieces, and a display rendering shows persons appearing to wear the clothing pieces within a realistic setting without the person physically trying on the clothing pieces. In some implementations, a setting may be at least one of a room, a bathroom, a dressing room, and the like. In some implementations, a digital screen display serves like a mirror such that a person may appear to be wearing clothing in a realistic setting with realistic lighting, In some implementations, the digital screen is connected with one or more input devices to receive input and display the image or video of a person standing in front of the display along with real-time environmental information behind and around the person(s), including the room surroundings, lighting and more. In some implementations, laser imaging, detection, and ranging (Lidar) and/or motion sensing input device, such as Kinect® produced by Microsoft® may be used to track the person for rendering purposes.

In some implementations of the AR clothing try-on, a person may stand in front of a mirror or a display, and an input device is located in, on, or around the mirror or display to receive an input of the image or video of the person standing in front of the mirror or display. In some implementations, the display may show a rendered video the person in a rendered dressing room, such that the video displays what appears like mirror image of the person standing in front of the display. In some implementations, a transparent display screen may be overlaid over a mirror or reflective surface, such that the rendered images, including rendered clothing pieces with realistic lighting, are displayed on the transparent screen overlaying the actual reflection of the person in the mirror. In some implementations, image-based lighting is incorporated into the display rendering such that details of the object clothing pieces are realistically lit as if actually worn on the person's body in a particular setting. For example, an object that is a pair of jeans will have matching lighting with the video of the person standing in a bedroom. In some implementations, the display may show the object clothing piece and person in a different setting or location with the corresponding realistic lighting. In some implementations, the setting-based lighting is consistent with the lighting used in AR systems. In another example, a person may want to see how a pair of dark blue jeans fits on the body and if the blue shade matches with a particular cotton shirt and the person's skin tone; thus, the rendering of the jeans appears appropriately lit within the local environment, and the lighting of the jeans matches with the lighting of the video of the person wearing the cotton shirt such that the rendering is realistic, thereby allowing the person to make better informed decisions as to how the jeans will look when the person is wearing them.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An image rendering system, comprising:
   a non-transitory memory storing an executable code, an object model, and a location information; and
   a hardware processor executing the executable code to:
   receive an environmental input from an environmental input device, the environmental input including a real-time environmental information; and
   generate a rendering of an object based on the object model, the location information, and the real-time environmental information, wherein the location information includes a GPS location of a stationary display where the rendering is to be displayed, and wherein the location information is dynamically updated based on a local sun position information.

2. The system of claim 1, wherein the system is further configured to:
receive a position input from a position input device, the position input including a viewer position information; and
update the rendering of the object based on the viewer position information.

3. The system of claim 1, wherein the system is further configured to:
receive a sound input from a sound input device, the sound input including a sound information; and
update the rendering of the object based on the sound information.

4. The system of claim 1, further comprising a display, and wherein the system is further configured to:
display the rendering of the object on the display, wherein the display is at least one of a digital screen, a television, a computer monitor, a digital advertising sign, and a billboard.

5. The system of claim 1, wherein the object model includes at least one of a structural information, a materials information, and a texture information.

6. The system of claim 1, wherein the environmental input device is at least one of a camera, a camera array, a website, a thermometer, a wind vane, and an anemometer, wherein the real-time environmental information includes at least one of a plurality of images covering a range of at least 180-degrees to 360-degrees views of a location, a panoramic image, a 2-dimensional (2-D) image, an environmental data, a local weather information, a local time information, and a lighting information.

7. The system of claim 3, wherein the sound input device is at least one microphone, and wherein the sound information includes one or more of a sound volume and a sound direction, and thereby alters an appearance of the rendering of the object based one or more of the sound volume and the sound direction.

8. The system of claim 1, wherein the system is further configured to:
receive a position information from one of a traffic information database and a viewer position input device;
determine a prevailing viewer's point of view (POV) based on the position information;
update the rendering of the object based on a prevailing viewer's POV, wherein the prevailing viewer's POV includes one of a direction of travel of the viewer, a prevailing viewer angle of viewing, a prevailing viewer position, and an orientation of the display.

9. A method for use with an image rendering system having a non-transitory memory and a hardware processor, wherein the non-transitory memory stores an object model and a location information, the method comprising:
receiving, using the hardware processor, an environmental input from an environmental input device, the environmental input including a real-time environmental information; and
generating, using the hardware processor, a rendering of an object based on the object model, the location information, and the real-time environmental information, wherein the location information includes a GPS location of a stationary display where the rendering is to be displayed, and wherein the location information is dynamically updated based on a local sun position information.

10. The method of claim 9, further comprising:
receiving, using the hardware processor, a position input from a position input device, the position input including a viewer position information; and
updating, using the hardware processor, the rendering of the object based on the viewer position information.

11. The method of claim 9, further comprising:
receiving, using the hardware processor, a sound input from a sound input device, the sound input including a sound information; and
updating, using the hardware processor, the rendering of the object based on the sound information.

12. The method of claim 9, wherein the method further comprises:
displaying, using the hardware processor, the rendering of the object on a display, wherein the display is at least one of a digital screen, a television, a computer monitor, a digital advertising sign, and a billboard.

13. The method of claim 9, wherein the object model includes at least one of a structural information, a materials information, and a texture information.

14. The method of claim 9, wherein the environmental input device is at least one of a camera, a camera array, a computer, a website, a thermometer, a wind vane, and an anemometer, wherein the real-time location information includes at least one of a plurality of images covering a range of at least 180-degrees to 360-degrees views of a location, a panoramic image, a 2-D image, an environmental data, a local weather information, local time information, and a lighting information.

15. The method of claim 11, wherein the sound input device is at least one microphone, and wherein the sound information includes one more of a sound volume and a sound direction, and thereby alters an appearance of the rendering of the object based on one or more of the sound volume and the sound direction.

16. The method of claim 9, wherein the non-transitory memory further stores a traffic information, and wherein the method further comprises:
receiving a position information from one of a traffic information database and a viewer position input device;
determining a prevailing viewer's point of view (POV) based on the position information;
updating, using the hardware processor, the rendering of the object based on a prevailing viewer's POV, wherein the prevailing viewer's POV includes one of a direction of travel of the viewer, a prevailing viewer angle of viewing, a prevailing viewer position, and an orientation of the display.

17. An image rendering system, comprising:
a non-transitory memory storing an executable code, an object model, and a location information, wherein the location information includes global positioning system (GPS) coordinates; and
a hardware processor executing the executable code to:
receive an environmental input from an environmental input device, the environmental input including a real-time environmental information;
generate a rendering of an object based on the object model, the location information, and the real-time environmental information;
receive a sound input from a sound input device, the sound input including a sound information; and
update the rendering of the object based on the sound information;

wherein the sound input device is at least one microphone, and wherein the sound information includes one or more of a sound volume and a sound direction, and thereby alters an appearance of the rendering of the object based one or more of the sound volume and the sound direction.

18. A method for use with an image rendering system having a non-transitory memory and a hardware processor, wherein the non-transitory memory stores an object model and a location information, the method comprising:

receiving, using the hardware processor, an environmental input from an environmental input device, the environmental input including a real-time environmental information;

generating, using the hardware processor, a rendering of an object based on the object model, the location information, and the real-time environmental information, wherein the location information includes a GPS location of a stationary display where the rendering is to be displayed;

receiving, using the hardware processor, a sound input from a sound input device, the sound input including a sound information; and updating, using the hardware processor, the rendering of the object based on the sound information;

wherein the sound input device is at least one microphone, and wherein the sound information includes one or more of a sound volume and a sound direction, and thereby alters an appearance of the rendering of the object based on one or more of the sound volume and the sound direction.

* * * * *